United States Patent [19]

Arai et al.

[11] Patent Number: 4,879,552
[45] Date of Patent: Nov. 7, 1989

[54] VARIABLE CAPACITANCE TYPE ENCODER

[75] Inventors: Yoshihiro Arai, Tokyo; Kouji Sasaki; Takanori Ohsaki, both of Kanagawa, all of Japan

[73] Assignee: Mitutoyo Mfg. Co., Ltd., Tokyo, Japan

[21] Appl. No.: 185,348

[22] Filed: Apr. 20, 1988

Related U.S. Application Data

[63] Continuation of Ser. No. 866,787, May 23, 1986, abandoned.

[30] Foreign Application Priority Data

May 23, 1985 [JP] Japan ............... 60-111826
May 23, 1985 [JP] Japan ............... 60-111827
May 27, 1985 [JP] Japan ............... 60-114474

[51] Int. Cl.⁴ .................. G01D 5/243; G01B 7/30
[52] U.S. Cl. .................. 340/870.37; 324/60 C
[58] Field of Search ....... 340/870.37, 347 M, 562; 324/61 R, 60 R, 60 C

[56] References Cited

U.S. PATENT DOCUMENTS

| | | | |
|---|---|---|---|
| 2,527,215 | 10/1950 | Hahn | 340/870.37 |
| 3,198,937 | 8/1985 | Wooster | 340/870.37 |
| 3,961,318 | 6/1976 | Farrand et al. | 340/870.37 |
| 4,092,579 | 5/1978 | Weit | 340/870.37 |
| 4,339,709 | 7/1982 | Brinier | 340/870.37 |

FOREIGN PATENT DOCUMENTS

0053091 6/1982 European Pat. Off. .
0946772 1/1964 United Kingdom .
2118720 11/1983 United Kingdom .
2166554 5/1986 United Kingdom .

OTHER PUBLICATIONS

E. V. Hardway, "Position Sensor Combines Low Cost with High Accuracy and Reliability", Electronics, Aug. 16, 1971, pp. 86–88.

*Primary Examiner*—David K. Moore
*Assistant Examiner*—Alvin Oberley
*Attorney, Agent, or Firm*—Koda and Androlia

[57] ABSTRACT

Disclosed is a variable capacitance type encoder for measuring the length of an object to be measured on the basis of the amount of a probe which is brought into contact with the object. The amount of the movement of the probe is detected by the variation of electrostatic capacity between a rotary disc which is secured to the shaft, e.g., threaded shaft of the probe, and fixed plates which are secured to a baseplate so as to be opposed to the rotary disc. Two fixed plates are opposed to the rotary disc, and at least one fixed plate is provided with first and second transmitting electrodes composed of a pluarlity of electrode elements to which voltages of different phases are applied and which are annularly arranged at regular intervals in the circumferential direction of the fixed plate. The phase difference between the voltages which are applied to both transmitting electrodes is 180°. On the other hand, the rotary disc is provided with first and second receiving electrodes for receiving signals of a common phase by electrostatic coupling with both transmitting electrodes. Each fixed plate is provided with an output electrode which electrostatically couples with the respective receiving electrode for fetching a signal through electrostatic coupling.

5 Claims, 7 Drawing Sheets

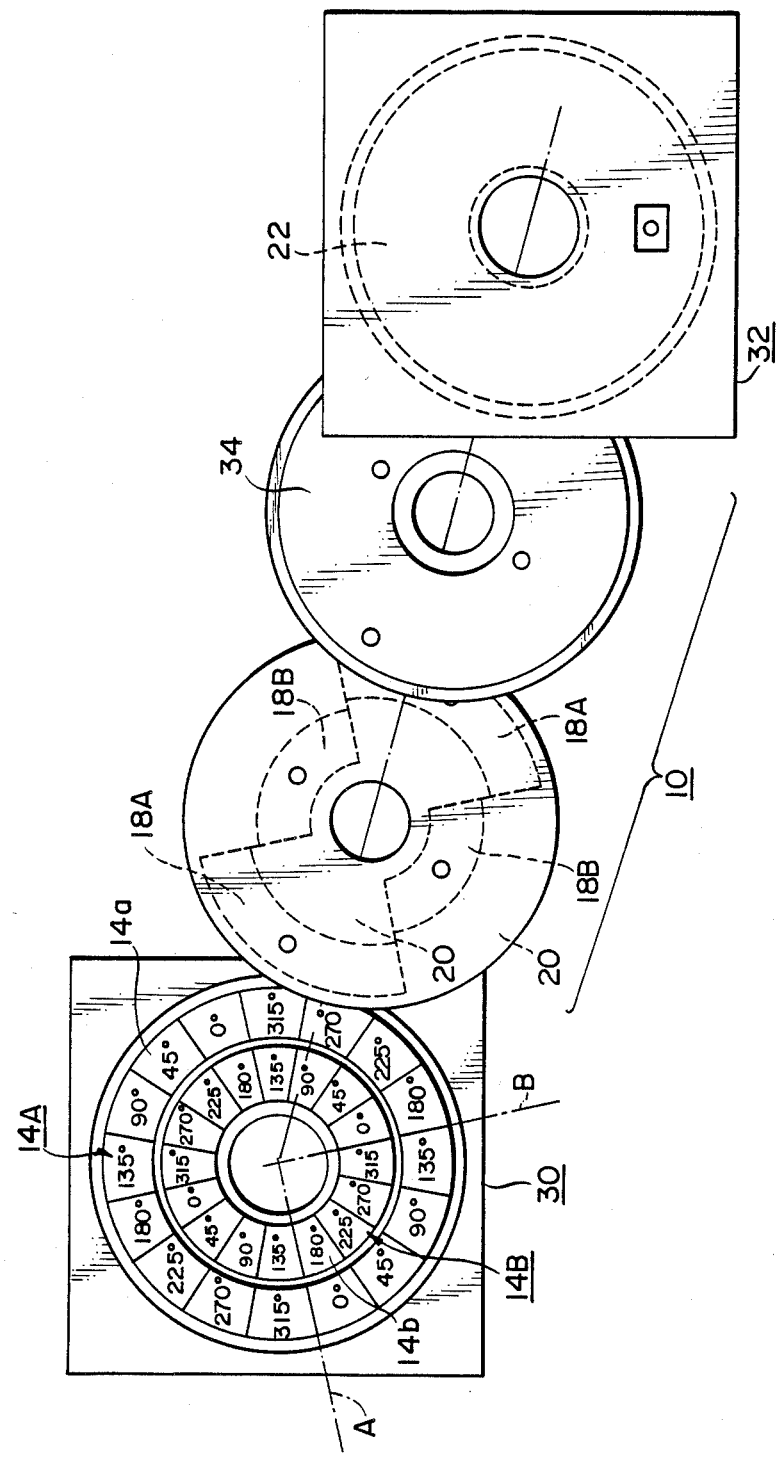

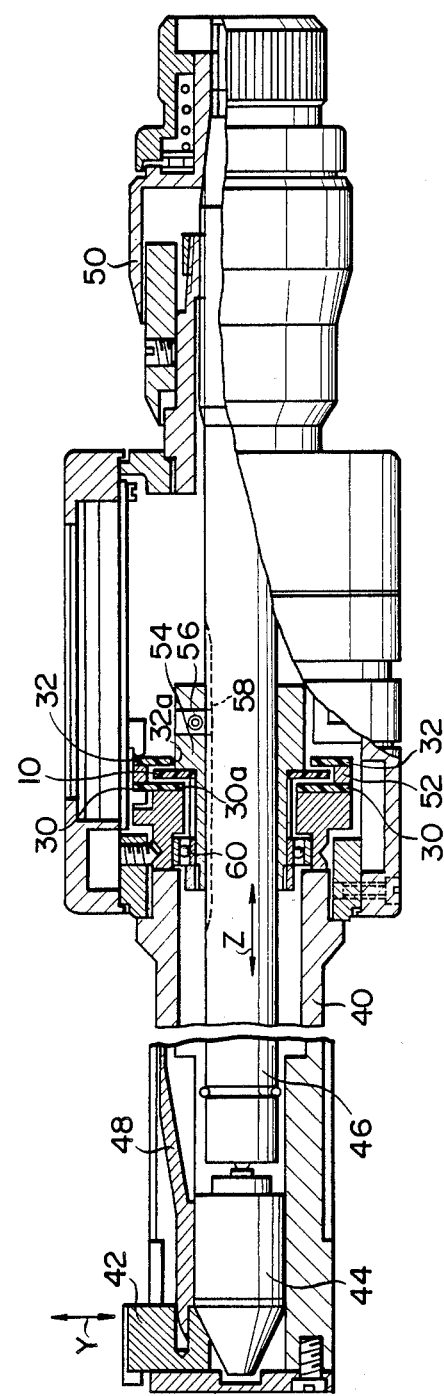

VARIABLE CAPACITANCE TYPE ENCODER

This is a continuation of application Ser. No. 866,787, filed May 23, 1986, abandoned.

BACKGROUND OF THE INVENTION

1. Field of the Invention

The present invention relates to a variable capacity type encoder and, more particularly, an improved variable capacity type encoder which electrically detects the rotary displacement of a rotary disc.

2. Description of the Prior Art

Various displacement measuring device are known which use an encoder. Such a displacement measuring device includes a probe which moves on the baseplate of the device to comes into contact with an object to be measured, measures the amount of the movement of the probe and digitally indicates that value.

As such kind of encoder, a variable capacitance type encoder is known, and a smaller-sized and lighter variable capacitance type encoder has been in demand in terms of the improvement of the portability and operability.

FIGS. 8 and 9 show an example of conventional variable capacitance type encoders. This encoder, which includes a rotary disc 10 which is rotatably mounted on the baseplate (not shown) by a rotary shaft 10a rotates in accordance with the amount of movement of a probe, and a fixed plate 12 attached to the baseplate so as to be opposed to the rotary disc 10, detects the rotary displacement of the rotary disc 10 in relation to the fixed plate 12.

For this purpose, the fixed plate 12 is provided with a plurality of electrode elements 14a which are annularly arranged on the surface thereof at regular intervals in the circumferential direction. These electrode elements 14a constitute a transmitting electrode 14. To each of the electrode elements 14a an alternating voltage of a sine wave or a rectangular wave having a predetermined phase difference, 45 in this example, is applied by a voltage supply circuit 16. In this example, alternating voltages with the phases shifted 45 degrees from each other are applied to the respective electrode elements, whereby plural groups of electrode units 100 are formed, each unit consisting of eight-phase electrode elements 14a.

Receiving electrodes 18 of the same number as the electrode units 100 are provided on the surface of the rotary disc 10, such that each receiving electrode 18 is opposed to a predetermined number of consecutive electrode elements 14a incorporated in each electrode unit 100.

In the encoder shown in FIG. 9, the receiving electrode 18 is disposed extendingly in the circumferential direction so as to be opposed to a group of four continuous electrode elements, namely, four electrode elements 14a to which the reference voltage $V_1$, the voltages $V_2$, $V_3$ and $V_4$, which are the voltages 45°, 90°, and 135° out-of-phase, respectively, with respect to the reference voltage $V_1$, are respectively applied.

A ground electrode 20 is interposed between every two adjacent receiving electrodes 18 on the surface of the rotary disc 10 in order to exclude the deleterious influence of the interference of the electrostatic capacities from the receiving electrodes 18 and the like.

In the encoder having the aforementioned structure, the rotation of the rotary disc 10 initiates the relative movement of the transmitting electrode 14 and the receiving electrodes 18, whereby, as is known, an electrostatic capacity signal $V_0$ having periodic change corresponding to the rotary displacement of the rotary disc 10 is detected from the receiving electrodes 18.

In order to fetch the voltages $V_0$ obtained by the receiving electrodes 18 on the rotary disc 10 to the baseplate side, a ring-like output electrode 22 is provided on the inside of the transmitting electrode 14 on the surface of the fixed plate 12. The receiving electrode 18 is disposed extendingly in the radial direction so as to be opposed to both the transmitting electrode 14 and the output signal 22.

This encoder having the above-described structure enables the capacity signals $V_0$ obtained by the receiving elements 18 to be output to the baseplate side through electrostatic coupling without the need for the mechanical contact between the rotary disc 10 and the fixed plate 12, and the rotary displacement of the rotary disc 10 to be measured accurately.

The conventional variable capacitance type encoder is, however, disadvantageous in that the structure having only one transmitting electrode 12 and one output electrode 22 arranged in a ring-like form on one fixed plate 12 precludes the possibility of the fixed plate 12 being reduced in size while maintaining a high measuring accuracy and detecting resolution, and as a result it is impossible to make the encoder smaller in the widthwise direction of the fixed plate 12.

More particularly, when both the transmitting electrode 14 and the output electrode 22 are provided on one fixed plate 12 in this way, deleterious influence of the interference of electrostatic capacities is likely to be produced between both electrodes 14 and 22. To eliminate these problems, it is necessary to dispose the transmitting electrode 14 and the output electrode 22 with a large space therebetween and to interpose a ring-like ground electrode 24 between them. Therefore, it is inevitable for the conventional encoder to have the large-sized fixed plate 12 having a complicated electrode structure on the surface. This large-sized fixed plate 12 constitutes a barrier to miniaturization of the encoder in the radial direction of rotation.

To remove such influence of the interference of electrostatic capacities and enable the miniaturization of an encoder in the radial direction of rotation, application of Japanese Patent Application No. 228785/1984 was filed on Oct. 29, 1984 by the present inventor Koji Sasaki and which was published on May 23, 1986 with Japanese Patent Laid-Open No. 105,421/86.

The variable capacitance type encoder disclosed in the above-described specification is shown in FIGS. 8 and 9. The same numerals are provided for those elements which are the same as those in the prior art shown in FIGS. 6 and 7, and explanation thereof will be omitted.

This encoder includes the rotary disc 10 which is rotatably mounted on the baseplate by the rotary shaft 10a, a first fixed plate 30 and a second fixed plate 32.

FIG. 9 shows the surface structure of each of the first fixed plate 30, the rotary disc 10 and the second fixed plate 32. In FIG. 9, the surface of the rotary disc 10 is shown in the exploded view with the surface facing the first fixed plate 30 separated from the surface facing the second fixed plate 32.

On the surfaces of the first fixed plate 30 and the rotary disc 10 are formed the transmitting electrode 14, and the receiving electrodes 18 and the ground electrodes 20, respectively.

A coupling electrode 34 is provided on the surface of the rotary disc 10 facing the second fixed plate 32 and is electrically connected to every receiving electrode 18 in order to fetch the voltage $V_0$ obtained by the receiving electrodes 18 to the baseplate side. The coupling electrode 34 is formed on the surface of the rotary disc 10 into a ring-like shape in the circumferential direction.

The ring-like output electrode 22 is provided on the surface of the second fixed plate 32 so as to be opposed to the coupling electrode 34, whereby the output electrode 22 outputs the electrostatic capacity signal $V_0$ induced at the receiving electrodes 18 by electrostatic coupling of output electrode 22 and the coupling electrode 34.

By comparing the signal $V_0$ output from the output electrode 22 with the reference voltage $V_1$ which is set in a detecting circuit 39, the rotary displacement of the rotary disc 10 is detected on the basis of the phase difference $\phi$.

In this encoder, as described above, the transmitting electrode 14, the receiving electrodes 18 and the coupling electrode 34, and the output electrode 22 are provided on the surfaces of the first fixed plate 30, the rotary disc 10 and the second fixed plate 32, respectively. Accordingly, each electrode provided on the surfaces of the fixed plates 30, 32 and the rotary disc 10 is free from the interference of the electrostatic capacities from other kinds of electrodes. Thus it is possible to make the electrodes 14, 18, 34 and 22 smaller to the extent of maintaining the detecting accuracy.

Particularly, since the interference of the static capacities of the transmitting electrode 14 and the output electrode 22 is ignored in this encoder unlike that in the prior art encoder shown in FIGS. 6 and 7, it is possible to make the radius of the transmitting electrode 14 much smaller than that in the prior art to obtain the same detecting accuracy, which fact enables the encoder to be reduced in size in the radial direction of rotation.

Incidentally, since this encoder is provided with the second fixed plate 32, the thickness of the encoder in the direction of the rotary shaft 10a is increased by that thickness in comparison with the prior art encoder. However, since each space between the rotary disc 20 and these fixed plates 30 and 32 is as small as about 1/10 mm, the increase in thickness in the axial direction resulting from the attachment of the second fixed plate 32 is almost negligible.

In order to improve the detecting resolution of this type of variable capacitance type encoder, it is necessary to increase the number of electrode elements 14a which constitute the transmitting electrode 14 while maintaining the area and intervals between each electrode element 14a at an appropriate value.

Therefore, in a conventional encoder having the transmitting electrode 14 consisting of the annularly arranged electrode elements 14a, enhancement of the detecting resolution necessitates increase in the radius of the transmitting electrode 14. In other words, the conventional encoder cannot meet both the demand for miniaturization of the encoder in the radial direction of rotation and the demand for improvement of the detecting resolution.

Furthermore, in variable capacitance type encoders, it is difficult to produce the rotary disc 10 and the first and second fixed plates 30, 32 without generation of eccentricity, whirling, offset or the like, which functions as the factor in producing an error in measuring.

SUMMARY OF THE INVENTION

Accordingly, it is an object of the present invention to provide a variable capacitance type encoder having a high measuring accuracy and is made smaller in size in the radial direction of rotation.

To achieve this aim, a variable capacitance type encoder according to the present invention includes a rotary disc which is rotatably mounted on the baseplate and rotates in accordance with the amount of movement of the probe, and first and second fixed plates which are fixed so as to be opposed to each other with the rotary disc therebetween. At least one of the fixed plates is provided with a first transmitting electrode composed of a plurality of electrode elements annularly arranged at regular intervals in the circumferential direction, to the first transmitting electrode alternating voltages of different phases being applied. A second transmitting electrode is provided on at least one of the fixed plates. It is composed of a plurality of electrode elements to each of which an alternating voltage 180° out-of-phase with respect to that applied to the respective electrode element of the first transmitting electrode is applied and which are annularly arranged at regular intervals in the circumferential direction of the fixed plate. The rotary disc is provided with first and second receiving electrodes which are opposed to the first and second transmitting electrodes, respectively, and which receive signals of a common phase by electrostatic coupling. An output electrode is provided on the surfaces of both fixed plates for fetching the receiving signals from the first and second receiving electrodes. Thus, the rotary displacement of the rotary disc is detected on the basis of the output signal of the output electrode which varies in accordance with the rotation of the rotary disc.

In one aspect of the present invention, the first and second receiving electrodes are concentrically annularly arranged on the first fixed plate. The first transmitting electrode consists of a plurality of electrode elements to which alternating voltages of different phases are applied, respectively, and which are annularly arranged at regular intervals in the circumferential direction. The second transmitting electrode consists of a plurality of electrode elements annularly arranged on the inside of the first transmitting electrode at regular intervals in the circumferential direction. An alternating voltage of 180° out-of-phase with respect to that applied to each electrode element of the first transmitting electrode is applied to each of the electrode elements of the second transmitting electrode.

In other words, the first and second transmitting electrodes respectively consist of coaxially and annularly arranged electrode elements of the same number, and a voltage of a phase difference of 180° is applied to each of the electrode elements which are situated at equiangular positions with respect to the center.

The rotary disc is provided with the first and second receiving electrodes for receiving the signals of the same phase so as to be opposed to the first and second transmitting electrodes, respectively. The rotary disc is further provided with a coupling electrode which is opposed to the second fixed plate so as to be electrically connected to the first and second receiving electrodes.

The second fixed plate is provided with the output electrode which is opposed to the coupling electrode.

In this way, according to the first aspect of the present invention, since the encoder has a two-system transmitting electrode consisting of the first and second transmitting electrodes as the transmitting electrode which determines the detecting accuracy, it is possible to detect the rotary displacement of the rotary disc at the accuracy two times as high as that of a conventional encoder of the same size which has a one-system transmitting electrode. In other words, if the detecting accuracy is the same, the number of the electrode elements which constitute each transmitting electrode is reduced to half the number of those of the conventional ones. As a result, it is possible to miniaturize the encoder itself in the radial direction of rotation to a great degree.

Furthermore, according to this aspect of the present invention, alternating currents of a phase difference of 180° are applied to each of the electrode elements which constitute the first and second transmitting electrodes, and the first and second receiving electrodes receive the voltage signals of the same phase from the first and second transmitting electrodes through electrostatic coupling. Consequently, even if the fixed plates or the rotary disc has a factor of error such as eccentricity, whirling, offset, the error component in measurement which would be generated by these factors of errors are cancelled each other by synthesizing the outputs of the first and second receiving electrodes by means of the coupling electrode, whereby an exact measurement signal is obtained from the output signal irrespective of the presence or absence of such a factor of error.

In another aspect of the present invention, the first and second transmitting electrodes are annularly and concentrically arranged on the first fixed plate. In this case, the first transmitting electrode consists of a plurality of electrode elements which are annularly arranged on the outer peripheral side of the surface of the first fixed plate at regular intervals in the circumferential direction. To each of the electrode elements an alternating voltage of a different phases is applied respectively. The second transmitting electrode consists of a plurality of electrode elements which are arranged on the inner peripheral side of the surface of the first fixed plate at regular intervals in the circumferential direction. To each of the electrode elements an alternating voltage 180° out-of-phase with respect to that applied to each electrode element of the first transmitting electrode is applied.

In short, the first and second transmitting electrodes respectively consist of the concentrically and annularly arranged electrode elements of the same number and the phase difference between the voltage applied to each of the electrode elements on the outer peripheral side and that applied to each of the electrode elements on the inner peripheral side is 180°

The second fixed plate is provided with the output electrode which is provided extendingly in the radial direction so as to be opposed both to the first and second transmitting electrodes.

The rotary disc is provided with a shielding portion. Only predetermined electrode elements of the first and second transmitting electrodes to which alternating voltages of a common phase are applied are opposed to the output electrode and the other electrode elements are shielded by this shielding portion.

In still another aspect of the present invention, the first fixed plate is preferably provided with the first transmitting electrode consisting of a plurality of electrode elements to which alternating voltages of different phases are applied and which are annularly arranged at regular intervals in the circumferential direction, and the first output electrode which is disposed on the inside of the first transmitting electrode through a shield ring.

The second fixed plate is provided with the second transmitting electrode which consists of a plurality of electrode elements to each of which an alternating voltage of 180° out-of-phase with respect to that applied to each electrode element of the first transmitting electrode is applied and which are annularly arranged at regular intervals in the circumferential direction, and the second output electrode which is disposed on the inside of the second transmitting electrode through a shield ring.

The rotary disc is provided with the first receiving electrodes each of which is formed extendingly in the radial direction so as to be opposed to both the first transmitting electrode and the first output electrode, and the second receiving electrodes each of which is formed extendingly in the radial direction so as to be opposed to both the second transmitting electrode and the second output electrode.

These first and second receiving electrodes are opposed to predetermined electrodes respectively to which alternating voltages of a common phase is applied.

According to this aspect of the present invention, the two-system transmitting electrode consisting of the first and second transmitting electrodes is used as the transmitting electrode which determines the detecting accuracy, and these two transmitting electrodes are provided on the first and second fixed plates, respectively, separately from each other. Accordingly, it is possible to detect the rotary displacement of the rotary disc at the accuracy two times as high as that of a conventional encoder of the same size which has a one-system transmitting electrode. In other words, if the detecting accuracy is the same, the number of the electrode elements which constitute each transmitting electrode is reduced to half the number of those of the conventional one. As a result, it is possible to miniaturize the encoder itself in the radial direction of rotation to a great degree.

Incidentally, since the second fixed plate is provided in the encoder according to this aspect of the invention, the thickness of the encoder in the direction of the rotary shaft is increased by that thickness in comparison with the prior art encoder. However, since the space between the rotary disc and the second fixed plate is generally very small, concretely, as small as about 1/10 mm, the increase in thickness in the axial direction resulting from the attachment of the second fixed plate is almost negligible.

According to this aspect of the present invention, the phase is different by 180° between the voltage applied to each of the first transmitting electrodes and that applied to each of the second transmitting electrodes, and the first and second receiving electrodes receive the respective voltage signals of the same phase by electrostatic coupling.

Consequently, even if there is a factor of error such as eccentricity, whirling, offset among the first and second fixed plates and the rotary disc, such error components in measurement which would be generated by these factors of errors are cancelled each other by fetching the outputs of the first and second receiving electrodes delivered from the first and second output electrodes and synthesizing them, whereby an exact measurement is enabled regardless of the presence or absence of such a factor of error.

The above and other objects, features and advantages of the present invention will become clear from the following description of the preferred embodiments thereof, taken in conjunction with the accompanying drawings.

BRIEF DESCRIPTION OF THE DRAWINGS

FIG. 2 explains the electrode structure of the encoder shown in FIG. 1;

FIG. 3 explains the structure of a measuring device which uses the encoder shown in FIG. 1;

DESCRIPTION OF THE PREFERRED EMBODIMENTS

Preferred embodiment of the present invention will be explained hereinunder with reference to the accompanying drawings. The same numerals are provided for those elements which are the same as those in the prior art shown FIGS. 8 to 11, and explanation thereof will be omitted.

First Embodiment

Figure 1:
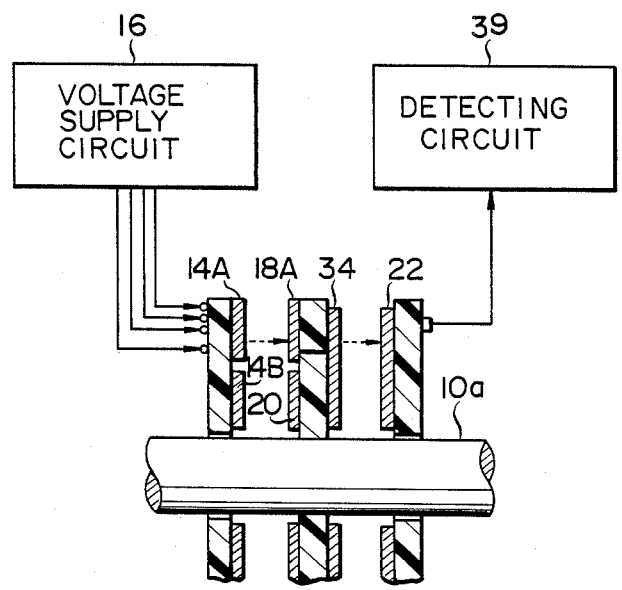
FIG. 1 is an explanatory view of a first embodiment of a variable capacitance type encoder according to the present invention.

Referring first to FIGS. 1 and 2, there is shown a preferred first embodiment of a variable capacitance type encoder according to the present invention. The characteristic of the present invention exists in that a variable type encoder is miniaturized and the detecting accuracy is enhanced by improving the structure of the electrodes provided on the rotary disc 10 and the first and second fixed plates 30 and 32.

To this end, a first transmitting electrode 14A and a second transmitting electrode 14B are concentrically and annularly arranged on the surface of the first fixed plate 30 of an encoder in accordance with the first embodiment. The first transmitting electrode 14A is composed of a plurality of electrode elements 14a which are annularly arranged on the outer peripheral side of the surface of the first fixed plate 30 at regular intervals in the circumferential direction. The second transmitting electrode 14B is composed of electrode elements 14b of the same number as the first transmitting electrode 14A which are annularly arranged on the inner peripheral side of the surface of the first fixed plate 30 at regular intervals in the circumferential direction.

In this embodiment, these first and second transmitting electrodes 14A and 14B consist of 16 electrode elements 14a and 14b, respectively, and each of the electrode elements 14a situated on the outer peripheral side and the electrode elements 14b situated on the inner peripheral side is fixed such that they are radially aligned with each other with respect to the center of the fixed plate 30.

An alternating voltage of a sine wave or rectangular wave having a predetermined phase difference, 45° in this embodiment, is applied to each of the electrode elements 14a of the first transmitting electrode 14B by a voltage supply circuit 16, and two electrode units, each unit consisting of eight-phase electrode elements from 0 to 315°, are formed.

On the other hand, an alternating voltage of a sine wave or rectangular wave 180° out-of-phase with respect to that applied to each electrode element 14a is applied to each of the electrode elements 14b of the second transmitting electrode 14B by a voltage supply circuit 16, and similarly two electrode units, each unit consisting of eight-phase electrode elements from 0° to 315°, are formed.

Accordingly, as shown in FIG. 2, alternating voltages of phase differences of 0°, 45°, 90°, . . . are subsequently applied to the first transmitting electrode 14A with the electrode element 14a which is situated at center line A as the starting point, while, alternating voltages of phase differences of 0°, 45°, 90°, . . . are subsequently applied to the second transmitting electrode 14B starting from the electrode element 14b which is situated at center line B, which is spaced from the center line A at a 180 phase interval in terms of an electrical angle.

On the outer peripheral side of the surface of the rotary disc 10 are provided receiving electrodes 18A of the same number as the electrode units of the first transmitting electrode 14A, namely, two. This pair of receiving electrodes 18A are disposed at the diametrically opposite positions with respect to the center of rotation, and are respectively opposed to four consecutive electrode elements 14a which are incorporated in the first transmitting electrode 14A.

On the inner peripheral side of the surface of the rotary disc 10 are provided receiving electrodes 18B of the same number as the electrode units of the second transmitting electrode 14B, namely, two. This pair of receiving electrodes 18B are disposed at the diametrically opposite positions with respect to the center of rotation, and are respectively opposed to four consecutive electrode elements 14b which are incorporated in the second transmitting electrode 14B.

The first and second receiving electrodes 18A and 18B are disposed at positions which are spaced from each other at a 90° phase interval in terms of mechanical angle with respect to the center of rotation. This arrangement enables signals of the same phase to be obtained from both receiving electrodes 18A and 18B. For example, when the first receiving electrode 18A is opposed to the four electrode elements 14a to which alternating voltages with the phases ranging from 0° to 135° are applied, the second receiving electrode 18B is similarly opposed to the four consecutive electrode elements 14b of the second transmitting electrode 14B to which alternating voltages with phases ranging from 0° to 135° are applied, whereby signals of the same phase are output from the receiving electrodes 18A and 18B.

The ground electrode 20 is provided on each space between the electrodes 18 on the surface of the rotary disc 10, thereby preventing deleterious influence of the interference of the electrostatic capacities from each of the receiving electrodes 18 or others.

In this way, the voltages $V_0$ which correspond to the displacement of the rotary disc 10 is induced by the first and second receiving electrodes 18A and 18B.

The coupling electrode 34 is provided on the surface of the rotary disc 10 facing the second fixed plate 32 and is electrically connected to the first and second receiving electrodes 18A and 18B, in order to fetch the voltages $V_0$ of the same phase which are obtained by the first and second receiving electrodes 18A and 18B.

The output electrode 22 is provided on the surface of the second fixed plate 32 so as to be opposed to the coupling electrode 34. The output electrode 22 is electrostatically coupled with the coupling electrode 34, thereby outputting the signal induced by the first and second receiving electrodes 18A and 18B.

The detecting signal $V_0$ which is output from the output signal 22 is compared with the reference voltage $V_1$ in the detecting circuit 39, whereby the rotary displacement of the rotary disc 10 is detected on the basis of the phase difference $\phi$.

As described above, according to this embodiment, two groups of transmitting electrodes, namely, the first and second transmitting electrodes 14A and 14B are provided on the fixed plate 30, and the signals $V_0$ corresponding to the rotary displacement of the rotary disc 10 are obtained by the first and second receiving electrodes 18A and 18B, respectively, which are provided on the rotary disc 10. The signals $V_0$ of the two receiving electrodes 18A and 18B are fetched from the output electrode 22 provided on the second fixed plate 32 through the electrostatic coupling of the coupling electrode 34 and the output electrode 22, whereby the rotary displacement of the rotary disc 10 is detected.

In this way, according to this embodiment, since the signals $V_0$ corresponding to the rotary displacement of the rotary disc 10 are generated from two-system transmitting electrodes and receiving electrodes, 14A, 14B and 18A, 18B, and the rotary displacement of the rotary disc 10 is detected on the basis of the signals $V_0$ produced from the two-system electrodes, it is possible to detect the rotary displacement of the rotary disc 10 with the detecting resolution as two times as high as that of a one-system encoder having one receiving electrode 14 and receiving electrode 18.

Accordingly, in order to obtain the same detecting accuracy as the conventional encoder shown in FIGS. 10 and 11 which includes only one transmitting electrode 14 consisting of annularly arranged 32 electrode elements, an encoder in accordance with this embodiment only requires the first transmitting electrode 14A and the second transmitting electrode 14B consisting of 16 annularly arranged electrode elements, respectively. In this case, the radii of the first and second transmitting electrodes 14A and 14B consisting of 16 annularly arranged electrode elements are largely reduced in comparison with the radius of the transmitting electrode 14 consisting of the 32 annularly arranged electrode elements. As a result, in the case of obtaining the same detecting accuracy, namely, resolution, as the conventional encoder, it is possible to largely reduce the size of the encoder in the widthwise direction, namely, in the radial direction of the rotary disc 10, thereby miniaturizing the encoder itself.

In addition, according to this embodiment, since two-system transmitting electrodes 14A, 14B of different phases and two-system and receiving electrodes 18A, 18B are provided on the first fixed plate 30 and the rotary disc 10, respectively, it is possible to detect the rotary displacement of the rotary disc 10 precisely without being affected by eccentricity, whirling or offset which might be existent among the fixed plates 30, 32 and the rotary disc 10.

Example of Applications

A measuring device for measuring the inner diameter of a work which uses a variable capacitance type encoder in accordance with the present invention is shown in FIG. 3.

A measuring device in the example includes a probe 42 for measuring the inner diameter which is attached at the fore end of a frame body 40 and goes back and forth in the radial direction indicated by the arrow Y, and a spindle 46 which is accommodated in the frame body 40 to go back and forth in the axial direction indicated by the arrow Z and comes into contact with the inside of the probe 42 at the fore end portion 44 thereof.

In this example, three probes 42 are provided on the fore end portion of the frame body 40 at the angular intervals of 120°. Each probe 42 is biased inwardly by a leaf spring 48 so as to come into contact with the fore end portion 44 of the spindle 46.

The fore end portion of the spindle 46 is formed into a conical shape, and the inner surface of the probe 42 is notched so as to come into contact with the fore end portion 44 in conformity with the conical shape thereof.

In the measuring device in this example, a thimble 50 which is integrally provided with the spindle 46 is rotated and moved back and forth in the axial direction indicated by the arrow Z, whereby the fore end portion 44 moves the probe 42 back and forth in the radial direction.

In this way, by detecting the state in which three probes 42 provided at the fore end portion of the frame body 40 are in contact with the inner surface of the work, the inner diameter of the work is detected as the displacement of the spindle 46 in the direction of Z.

In the device in this example, the displacement of the spindle 46 is detected by the encoder in accordance with the present invention, and the electrical signal pulse corresponding to the detected displacement is input into a digitizing circuit. The digitizing circuit digitizes the electrical signal pulse output from the encoder, and indicates the digital value on a digital display provided on the side surface of the frame body 40.

The encoder used for the device in this example includes the first and second fixed plates 30 and 32 which are fixed to the frame body 40, and the rotary disc 10 which rotates in accordance with the amount of movement of the spindle 46 provided between the fixed plates 30 and 32.

The first and second fixed plates are formed into a substantially doughnut shape, and are secured to the base 52 of the frame body 40 with the spindle 46 inserted into through holes 30a and 30b provided at the center of the fixed plates 30 and 32 so as to be movable back and forth.

The rotary disc 10 is also formed into a substantially doughnut shape, and is disposed on a rotary sleeve 54 which is rotatably provided around the spindle 46 so as to be opposed to the first and second fixed plates 30 and 32.

A pin 56 is provided on the inner periphery of the rotary sleeve 54 so as to be engaged with a key groove 58 which is provided on the outer periphery of the spindle 46 in the travelling direction thereof.

The rotary sleeve 54 is also provided with a thrust angular contact bearing 60 to prevent the displacement of the rotary sleeve 54 in the direction of the spindle axis.

When the thimble 50 is rotated to rotate and move the spindle 46 back and forth in the axial direction indicated by Z in FIG. 3, the rotary sleeve 54 is rotated without any displacement by virtue of the engagement of the pin 56 with the key groove 58, and the rotary disc 10 is rotated in accordance with the amount of displacement of the spindle 46 while keeping a clearance constant between itself and the first and second fixed plates 30 and 32.

Accordingly, the measuring device in this example enables the displacement of the probe 42 in the radial direction indicated by the arrow Y to be accurately detected by the use of the encoder in accordance with the present invention, and thereby enables the accurate measurement of various inner diameters of the work.

Although, in the above example, the encoder in accordance with the present invention is applied to the measurement device for measuring the inner diameter of a work, it will be understood that the present invention is not limited to this application but is adaptable to other measuring devices such as a micrometer, indicating gage, and microgage.

Second Embodiment

Figure 4:
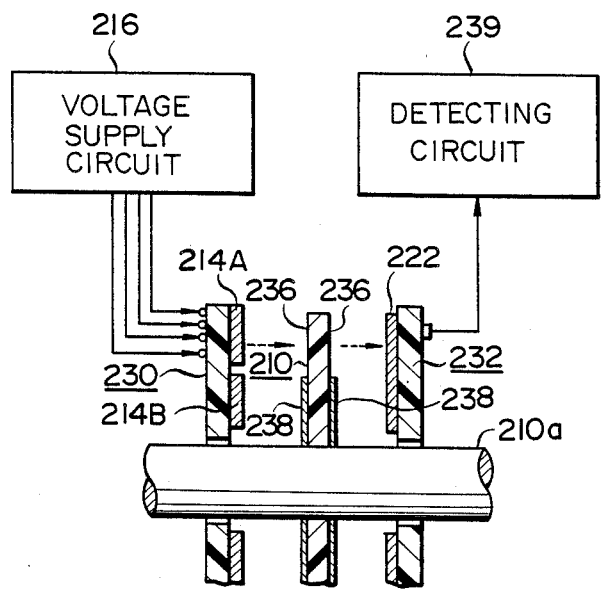
FIG. 4 is an explanatory view of a second embodiment of a variable capacitance type encoder according to the present invention.
Figure 5:
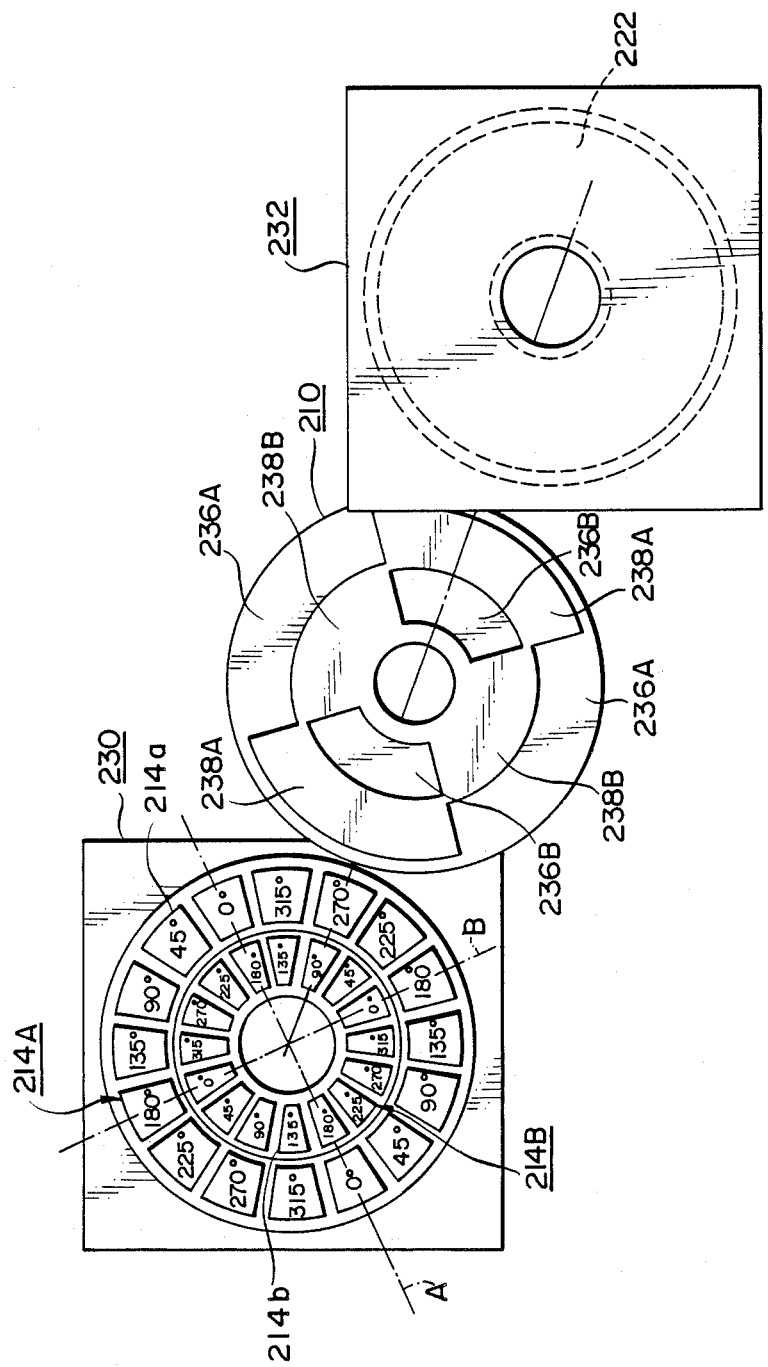
FIG. 5 explains the electrode structure of the encoder shown in FIG. 4.
Figure 6:
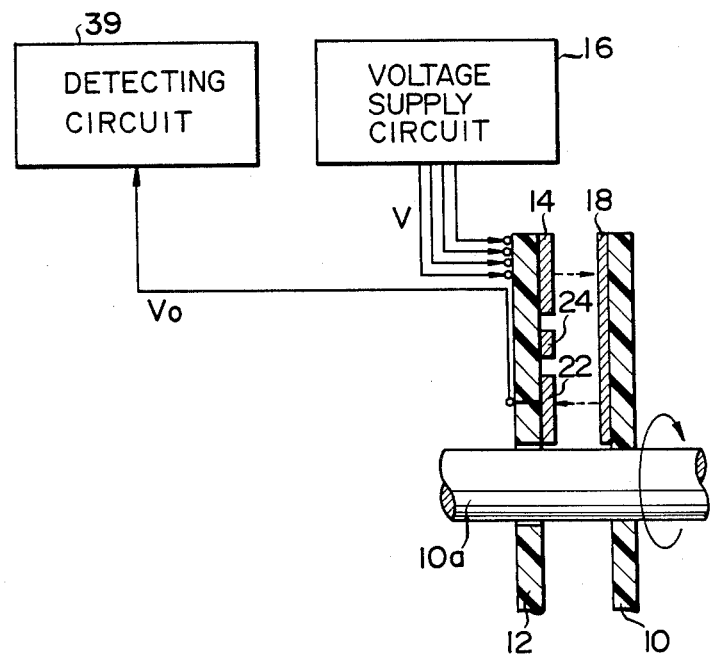
FIGS. 6 and 7 are explanatory views of a conventional encoder.
Figure 7:
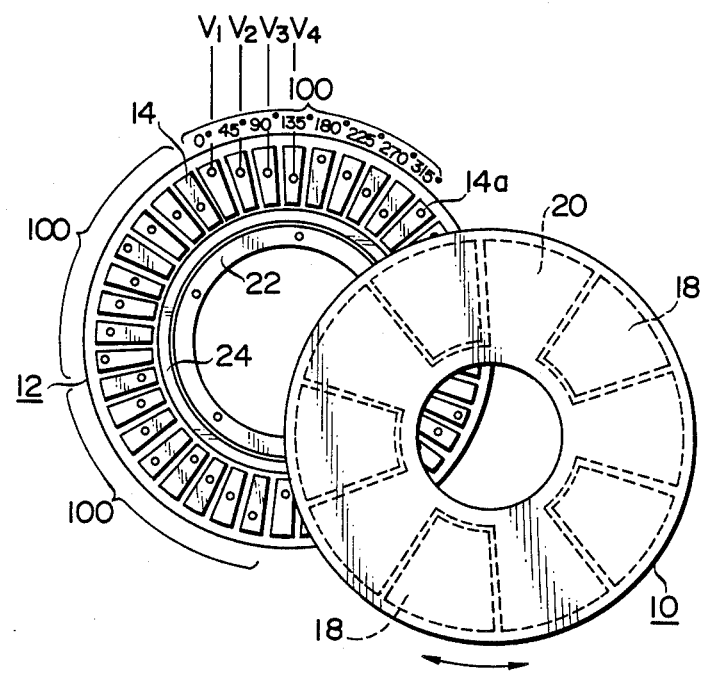
Figure 8:
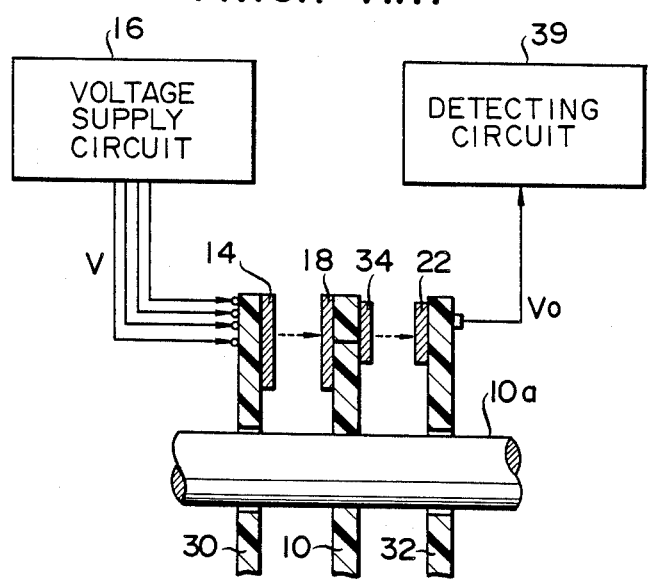
FIGS. 8 and 9 are explanatory views of another conventional encoder.
Figure 9:
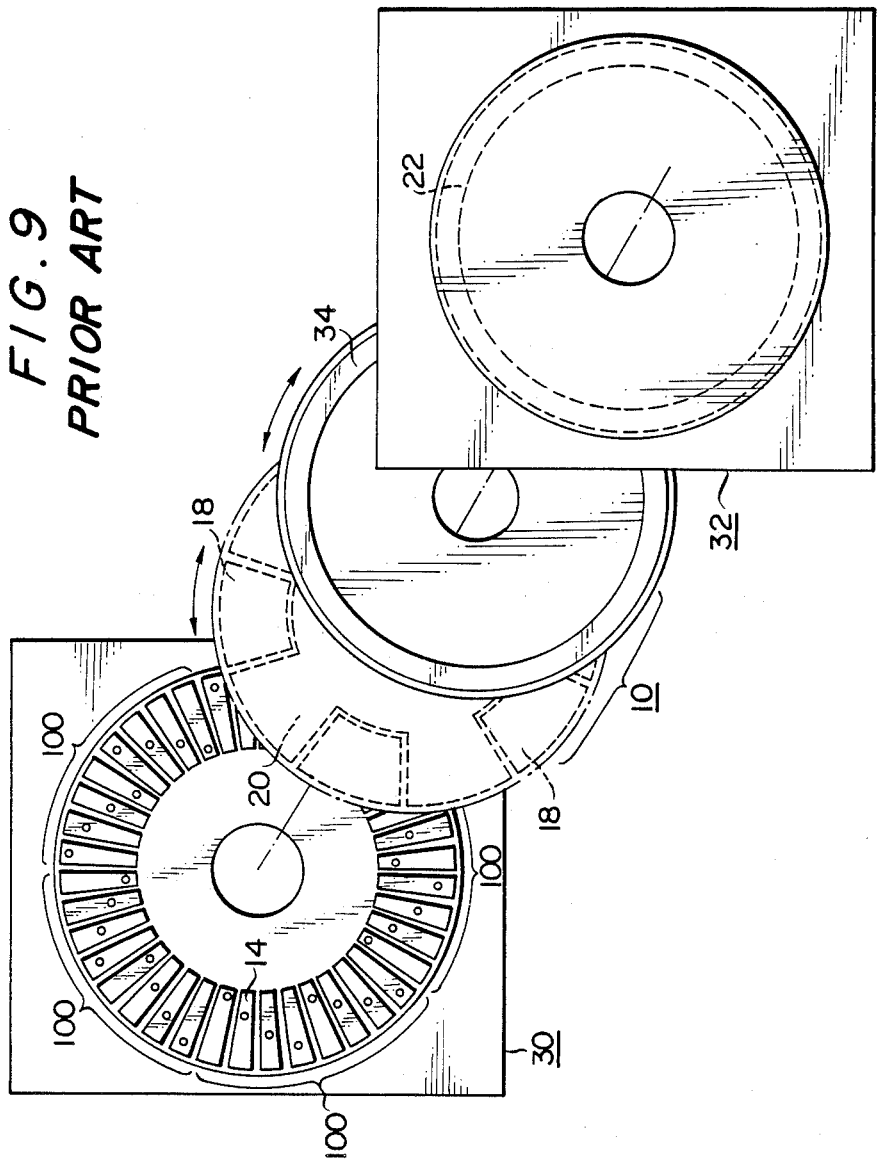

Another preferred embodiment of a variable capacitance type encoder according to the present invention is shown in FIGS. 4 and 5.

A first transmitting electrode 214A and a second transmitting electrode 214B are concentrically and annularly arranged on the surface of a first fixed plate 230 of an encoder in accordance with the second embodiment. The first transmitting electrode 214A is composed of a plurality of electrode elements 214a which are annularly arranged on the outer peripheral side of the surface of a first fixed plate 230 at regular intervals in the circumferential direction. A second transmitting electrode 214B is composed of electrode elements 214b of the same number as the first transmitting electrode 214A which are annularly arranged on the inner peripheral side of the surface of the first fixed plate 230 at regular intervals in the circumferential direction.

In this embodiment, these first and second transmitting electrodes 214A and 214B consist of 216 electrode elements 214a and 214b, , respectively, and each of the electrode elements 214a situated on the outer peripheral side and the electrode elements 214b situated on the inner peripheral side is fixed such that they are axially aligned with each other with respect to the center of the fixed plate 230.

An alternating voltage of a sine wave or rectangular wave having a predetermined phase difference, 45° in this embodiment, is applied to each of the electrode elements 214a of the first transmitting electrode 214B by a voltage supply circuit 216, and two electrode units, each unit consisting of eight-phase electrode elements from 0° to 315°, are formed.

On the other hand, an alternating voltage of a sine wave or rectangular wave 180° out-of-phase with respect to that applied to each electrode element 214a is applied to each of the electrode elements 214b of the second transmitting electrode 214B by a voltage supply circuit 216, and similarly two electrode units, each unit consisting of eight-phase electrode elements from 0° to 315°, are formed.

Accordingly, as shown in FIG. 5, alternating voltages of the phase differences of 0°, 45°, 90°, . . . are subsequently applied to the first transmitting electrode 214A with the electrode element 214a which is situated at the center line A as the starting point, while, alternating voltages of the phase differences of 0°, 45°, 90°, . . . are subsequently applied to the second transmitting electrode 214B starting from the electrode element 214b which is situated at the center line B, which is spaced from the center line A at a 180° phase interval in terms of an electrical angle.

On the surface of the second fixed plate 232 a discal output electrode 222 is provided in the radial direction so as to be opposed to both the first and second transmission electrodes 214A and 214B.

In this embodiment, a non-shielding portion 236 and a shielding portion 238 are provided on the surface of a rotary disc 210, so that the electrostatic coupling between the first and second electrodes 214A, 214B and the output electrode 222 is controlled, and the signal $V_0$ which is output from the output electrode in accordance with the rotary displacement of the rotary disc 210 is output.

In this embodiment, the rotary disc 210 is composed of a substrate of a known non-shielding material, and the shielding portion 238 is formed by coating the substrate with a known shielding material such as copper foil and stainless steel and connecting this portion to the ground side.

The portion of the surface of the rotary disc 210 which is not coated with the shielding material constitutes the non-shielding portion 236 in this case. Alternatively, the entire surface of the rotary disc 210 may be coated with the shielding material, and thereafter the portion corresponding to the non-shielding portion may be formed by stamping.

In this embodiment, the non-shielding portion 236 consists of first non-shielding portions 236A of the same number as the electrode units of the first transmitting electrodes 214A, namely, two, and second non-shielding portions 235B of the same number as the electrode units of the second transmitting electrodes 214B, namely, two.

The two first non-shielding portions 236A are disposed at the diametrically opposite positions with the center of rotation therebetween on the outer peripheral side of the surface of the rotary disc 210 so as to be opposed respectively to the four consecutive electrode elements 214a which are incorporated in the first transmitting electrodes 214A.

The two second non-shielding portions 236B are disposed at the diametrically opposite positions with the center of rotation therebetween on the inner peripheral side of the surface of the rotary disc 210 so as to be opposed respectively to the four consecutive electrode elements 214b which are incorporated in the second transmitting electrode 214B.

The first and second non-shielding portions 236A and 236B are disposed at the positions which are spaced from each other at a 90° phase interval in terms of mechanical angle (180° phase interval in terms of electrical angle) with respect to the center of rotation so as to be opposed to the electrode elements of the same phase incorporated in the transmitting electrodes 214A and 214B, respectively.

In this embodiment, the shielding portion 238 consists of two first shielding portions 238A and two second shielding portions 238B.

The two first shielding portions 238A are respectively disposed at the diametrically opposite positions between the first non-shielding portions 236A so as to be opposed respectively to the four consecutive electrode elements 214a which are incorporated in the first transmitting electrodes 214A in order to shield the electrostatic coupling between the opposite electrodes 214a and the output electrode 222.

The two second shielding portions 238B are respectively disposed at the diametrically opposite positions between the second non-shielding portions 236B so as to be opposed respectively to the four consecutive electrode elements 214b which are incorporated in the second transmitting electrodes 214B in order to shield the electrostatic coupling between the opposite electrodes 214b and the output electrode 222.

This arrangement allows the electrostatic coupling of the output electrodes 214a and 214b that are opposed to the first and second non-shielding portions 236A and 236B, respectively, and, on the other hand, effects a good shielding by virtue of the shielding portions in the other region, namely, in the region where the first and second shielding portions 238A and 238B are opposed to the first and second transmitting electrodes 214A and 214B, thereby preventing any electrostatic coupling between those transmitting electrodes 214A, 214B and the output electrode 222.

For example, when the output electrode 222 is in the electrostatic coupling with the four electrode elements 214a of the first transmitting electrode 214A to which alternating voltages with the phases ranging from 0° to 135° are applied, the output electrode 222 is similarly electrostatically coupled with the four electrode elements 214b of the second transmitting electrodes 214B to which alternating voltages with the phases ranging from 0° to 135° are applied, whereby the signals $V_0$ of the same phase which are input into the output electrode 222 is output therefrom.

When the signal $V_0$ which corresponds to the rotary displacement of the rotary disc 210 is output from the output electrode 222 in this way, the detecting signal $V_0$ is compared with the reference voltage $V_1$ in a detecting circuit 239, whereby the rotary displacement of the rotary disc 210 is detected on the basis of the phase difference $\Phi$.

As described above, in the encoder in accordance with this embodiment, the first and second transmitting electrodes 214A and 214B are provided on the first fixed plate 230, and these transmitting electrodes 214A and 214B are electrostatically coupled with the output electrode 222 through the first and second non-shielding portions 236A and 236B which are formed on the rotary disc 210. The output electrode 222 outputs the signal $V_0$ which corresponds to the rotary displacement of the rotary disc 210 through the electrostatic coupled portions of the two-system transmitting electrodes, and on the basis of the output signal $V_0$, the rotary displacement of the rotary disc 210 is detected.

According to this embodiment, since the signals $V_0$ corresponding to the rotary displacement of the rotary disc 210 are produced by electrostatic coupling of the two-system transmitting electrodes, and the signals $V_0$ obtained from the two-system transmitting electrodes are synthesized on the output electrode side so as to detect the rotary displacement of the rotary disc 210, the detecting resolution of the rotary displacement of the rotary disc 210 is increased by approximately two times that of a conventional encoder which has only one-system electrostatic coupling portion between the transmitting electrode 14 and the output electrode 22.

Accordingly, in order to obtain the same detecting resolution as the conventional encoder shown in FIGS. 10 and 11 which includes only one transmitting electrode 14 consisting of annularly arranged 32 electrode elements, an encoder in accordance with this embodiment only requires the first transmitting electrode 214A and the second transmitting electrode 214B consisting of 16 annularly arranged electrode elements, respectively. In this case, the radii of the first and second transmitting electrodes 214A and 214B consisting of 16 annularly arranged electrode elements are largely reduced in comparison with the radius of the transmitting electrode 14 consisting of the 32 annularly arranged electrode elements. As a result, in the case of obtaining the same detecting resolution, as the conventional encoder, it is possible to largely reduce the size of the encoder in the radial direction of rotation, thereby miniaturizing the encoder itself.

Furthermore, according to this embodiment, the first transmitting electrodes 230 and second transmitting electrodes 232 are electrostatically coupled through the two-system electrostatic coupling portions, it is possible to detect the rotary displacement of the rotary disc 210 precisely without being affected by eccentricity, whirling or offset which might be existent among the fixed plates 230, 232 and the rotary disc 210.

Still further, according to this embodiment, since the transmitting electrodes 214 and output electrode 222 are directly coupled without using any coupling electrode, it is possible to obtain the signal $V_0$ of good S/N ratio from the output electrode 222.

In addition, according to this embodiment, since it is sufficient to provide the shielding portion 238 on the rotary disc 210 by coating the rotary disc 210 with, e.g., a shielding material, and a conventional receiving electrode and coupling electrode are dispensed with, it is possible to manufacture the rotary disc 210 very easily and at a low cost.

While there has been described what are at present considered to be preferred embodiments of the invention, it will be understood that various modifications may be made therein, and it is intended that the appended claims cover all such modifications as fall within the true spirit and scope of the invention.

What is claimed is:

1. A variable capacitance type encoder comprising:
   a rotary disc which is rotatably mounted on a frame body and rotates in accordance with the amount of movement of a probe; and
   first and second fixed plates which are secured to said frame body such as to be opposed to each other with said rotary disc therebetween;
   wherein at least one of said first and second fixed plates is provided with a first transmitting electrode composed of a plurality of consecutive electrode elements to which alternating voltages of different phases are applied and which are annularly arranged at regular intervals in the circumferential direction of said at least one of said fixed plates;
   at least one of said first and second fixed plates is provided with a second transmitting electrode which is composed of a plurality of consecutive electrode elements aligned in the radial direction, with respect to the center of said at least one fixed plate, with a corresponding electrode of said first transmitting electrode and to each of said second transmitting electrode is applied an alternating voltage 180° out-of-phase with respect to that applied to its corresponding electrode element of said first transmitting electrode and which are annularly arranged at regular intervals in the circumferential direction of said at least one of said fixed plates;

wherein said rotary disc is provided with first and second receiving electrodes which are opposed to a plurality of said consecutive first and second transmitting electrodes, respectively, and which receive signals of a common phase by electrostatic coupling, said first and second receiving electrodes being disposed at positions which are spaced from each other at a predetermined phase interval in terms of mechanical angle with respect to the center of rotation;

wherein an output electrode is provided on a surface of at least one of said fixed plates for fetching the receiving signals from said first and second receiving electrodes, whereby the rotary displacement of the rotary disc is detected on the basis of the output signal of said output electrode which varies in accordance with the rotation of said rotary disc;

wherein said first fixed plate is provided with said first transmitting electrode composed of said plurality of electrode elements to which alternating voltages of different phases are applied and which are annularly arranged at regular intervals in the circumferential direction of said first fixed plate, and said second transmitting electrode composed of said plurality of electrode elements to each of which an alternating voltage 180° out of phase with respect to that applied to each electrode element of said first transmitting electrode and which are annularly arranged on the inside of said first transmitting electrode at regular intervals in the circumferential direction of said first fixed plate; and wherein the electrode elements of the first and second transmitting electrodes and the first and second receiving electrodes each form concentric rings with one on the outer peripheral side of a surface of said first fixed plate and other on the inner peripheral side of said surface;

whereby displacement of the rotary disk is detected precisely without being effected by eccentricity, whirling or offset which may exist among the fixed plates and rotary disk.

2. A variable capacitance type encoder according to claim 1, wherein said rotary disk is provided with a coupling electrode which is electrically coupled with said first and second receiving electrodes and is opposed to said second fixed plate; and said second fixed plate is provided with said output electrode which is opposed to said coupling electrode.

3. An encoder according to claim 2, wherein
said first transmitting electrode is composed of 16 electrode elements to each of which an alternating voltage 45° out-of-phase with respect to each other is applied; and
said second transmitting electrode is composed of 16 electrode elements to each of which said alternating voltage 180° out-of-phase with respect to that applied to the electrode element of said first transmitting electrode is applied.

4. An encoder according to claim 3, wherein
said first receiving electrode is composed of two electrode elements which are disposed on the surface of said rotary disc at diametrically opposite positions with respect to the center of rotation and each of which is so constructed as to be opposed to four consecutive electrode elements of said first transmitting electrodes; and said second receiving electrode is composed of two electrode elements which are disposed on the surface of said rotary disc at diametrically opposite positions with respect to the center of rotation which are spaced at a 90° phase interval, and each of which is so constructed as to be opposed to four consecutive electrode elements of said second transmitting electrodes.

5. A variable capacitance encoder comprising:
a rotary disc which is rotatably mounted on a frame body and rotates in accordance with the amount of movement of a probe; and first second fixed plates which are secured to said frame body such as to be opposed to each other with said rotary disc therebetween;

wherein at least one of said first and second fixed plates is provided with a first transmitting electrode composed of a plurality of consecutive electrode elements to which alternating voltages of different phases are applied and which are annularly arranged at regular intervals in the circumferential direction of said at least one of said fixed plates;

at least one of said first and second fixed plates is provided with a second transmitting electrode which is composed of a plurality of consecutive electrode elements aligned in the radial direction, with respect to the center of said at least one of said fixed plates, with a corresponding electrode of said first transmitting electrode and to each of said second transmitting electrodes is applied an alternating voltage 180° out-of-phase with respect to that applied to its corresponding electrode element of said first transmitting electrode and which are annularly arranged at regular intervals in the circumferential direction of said at least one of said fixed plates;

wherein an output electrode is provided on a surface of at least one of said fixed plates;

wherein said first fixed plate is provided with said first transmitting electrode composed of said plurality of electrode elements to which alternating voltages of different phases are applied and which are annularly arranged at regular intervals in the circumferential direction of said first fixed plate, and said second transmitting electrode composed of said plurality of electrode elements to each of which an alternating voltage 180° out of phase with respect to that applied to each electrode element of said first transmitting electrode and which are annularly arranged on the inside of said first transmitting electrode at regular intervals in the circumferential direction of said first fixed plate;

wherein said second fixed plate is provided with said output electrode which is provided extendingly in the radial direction so as to be opposed to both of said first transmitting electrode and said second transmitting electrode;

wherein said rotary disk is provided with a shielding portion which allows an electrostatic coupling only between predetermined electrode elements of said first and second transmitting electrodes to which alternating voltages of a common phase are applied and said output electrode, and shields the other electrode elements, wherein said output electrode is for fetching the receiving signal from non-shielded portions of said first and second transmitting electrodes, whereby the rotary displacement of the rotary disk is detected on the basis of the output signal of said output electrode which is varies in accordance with the rotation of said rotary disk; and wherein the electrode elements of the first and second transmitting electrodes form concentric rings with one on the outer peripheral side of a surface of said first fixed plate and the other on the inner peripheral side of said surface;

whereby displacement of the rotary disk is detected precisely without being effected by eccentricity, whirling or offset which may exist among the fixed plates and the rotary disk.

* * * * *